United States Patent
Shoji

[19]
[11] Patent Number: 5,963,546
[45] Date of Patent: Oct. 5, 1999

[54] METHOD OF SEARCHING FOR AVAILABLE PATH IN MESH ARCHITECTURE

[75] Inventor: Yoshiaki Shoji, Tokyo, Japan

[73] Assignee: NEC Corporation, Tokyo, Japan

[21] Appl. No.: 08/800,117

[22] Filed: Feb. 13, 1997

[30] Foreign Application Priority Data

Feb. 14, 1996 [JP] Japan .................................. 8-026590

[51] Int. Cl.⁶ .................................................. H04J 3/26
[52] U.S. Cl. .................... 370/255; 370/238; 370/244; 370/400
[58] Field of Search .................... 370/400, 401, 370/406, 408, 389, 352, 244, 255, 256, 238

[56] References Cited

U.S. PATENT DOCUMENTS

| | | | |
|---|---|---|---|
| 4,742,511 | 5/1988 | Johnson | 370/406 |
| 4,905,233 | 2/1990 | Cain et al. | 370/400 |
| 4,987,536 | 1/1991 | Humblet | 370/400 |
| 5,086,428 | 2/1992 | Perlman et al. | 370/410 |
| 5,317,566 | 5/1994 | Joshi | 370/400 |
| 5,452,294 | 9/1995 | Natarajan | 370/351 |
| 5,488,608 | 1/1996 | Flammer, III | 370/400 |
| 5,495,479 | 2/1996 | Galaand et al. | 370/238 |
| 5,596,719 | 1/1997 | Ramakrishnan et al. | 370/238 |
| 5,600,638 | 2/1997 | Bertin et al. | 370/400 |
| 5,649,108 | 7/1997 | Spiegel et al. | 370/400 |
| 5,699,358 | 12/1997 | Festl et al. | 370/406 |

FOREIGN PATENT DOCUMENTS

| | | |
|---|---|---|
| 62-216542 | 9/1987 | Japan . |
| 63-67048 | 3/1988 | Japan . |
| 63-217746 | 9/1988 | Japan . |
| 5-292125 | 11/1993 | Japan . |
| 5-300173 | 11/1993 | Japan . |
| 6-261078 | 9/1994 | Japan . |

OTHER PUBLICATIONS

Interconnections—Bridges and Routers pp. 110–114 May 31, 1995.

*Primary Examiner*—Chi H. Pham
*Assistant Examiner*—Frank Duong
*Attorney, Agent, or Firm*—Sughrue, Mion, Zinn, Macpeak & Seas, PLLC

[57] ABSTRACT

A method of searching for an available path in a mesh architecture in a multinode transmission system having a plurality of node apparatuses is disclosed. In setting a shortest path between first and second node apparatuses, the identity of a destination node and the immediate adjacent path along the shortest path from a source node are registered as path management data, for the source node, in a path management table. The identity of a destination node and the immediate adjacent path along the shortest path from each relay node is registered as path management data, for each relay node, in a path management table. Searching for an available path between two node apparatuses is performed on the basis of the path management data in the path management table. By limiting each data registration for each respective node to a destination and immediate path, the memory space for maintaining path management and control and the time required to search for an available path are reduced.

15 Claims, 2 Drawing Sheets

| TARGET NODE | TRANSMISSION PATH | USE TIME |
|---|---|---|
| H | c | O/O/O △:△:△ |
| D | c | O/O/O △:△:△ |
| C | a | O/O/O △:△:△ |
| F | a | O/O/O △:△:△ |

METHOD OF SEARCHING FOR AVAILABLE PATH IN MESH ARCHITECTURE

BACKGROUND OF THE INVENTION

The present invention relates to a method of setting the shortest path between a plurality of node apparatuses and, more particularly, to a connection method for a mesh network.

According to a conventional method of searching for an available path in a mesh architecture, when the shortest path is to be set between a plurality of node apparatuses, the connection relationship between available transmission paths on a transmission system and the node apparatuses is always searched, and all the paths that are searched out are recorded on a management table.

In the conventional method of searching for an available path in a mesh architecture, in searching for the shortest path, the connection relationship between the positions of available transmission paths and the node apparatuses is always searched, and all the paths that are searched out are recorded on the management table. For this reason, as the network architecture increases in size and becomes complicated the amount of information for path management greatly increases, posing a problem in terms of the capacity of the memory. In addition, it takes time to search the path management information for necessary data.

SUMMARY OF THE INVENTION

It is an object of the present invention to provide a method of searching for an available path in a mesh architecture in which only necessary path information is recorded, thereby reducing the load imposed on the storage capacity of a management table.

In order to achieve the above object, the present invention, provides a method of searching for an available path in a mesh architecture in a transmission system that includes a plurality of node apparatuses having a plurality of paths connected to a mesh network. The method includes the steps of, in setting a shortest path between first and second node apparatuses of the node apparatuses, registering data associated with a transmission path connected to a node apparatus adjacent to the first node apparatus and constituting the shortest path, as path management data for the first node apparatus in a path management table, registering data associated with a transmission path connected to a node apparatus adjacent to each relay node apparatus, of the node apparatuses, present on the shortest path and constituting the shortest path, as path management data for each relay node apparatus, in the path management table, and searching for an available path between the node apparatuses on the basis of the path management data in the path management table.

DESCRIPTION OF THE PREFERRED EMBODIMENT

The present invention will be described in detail below with reference to the accompanying drawings.

Figure 1:
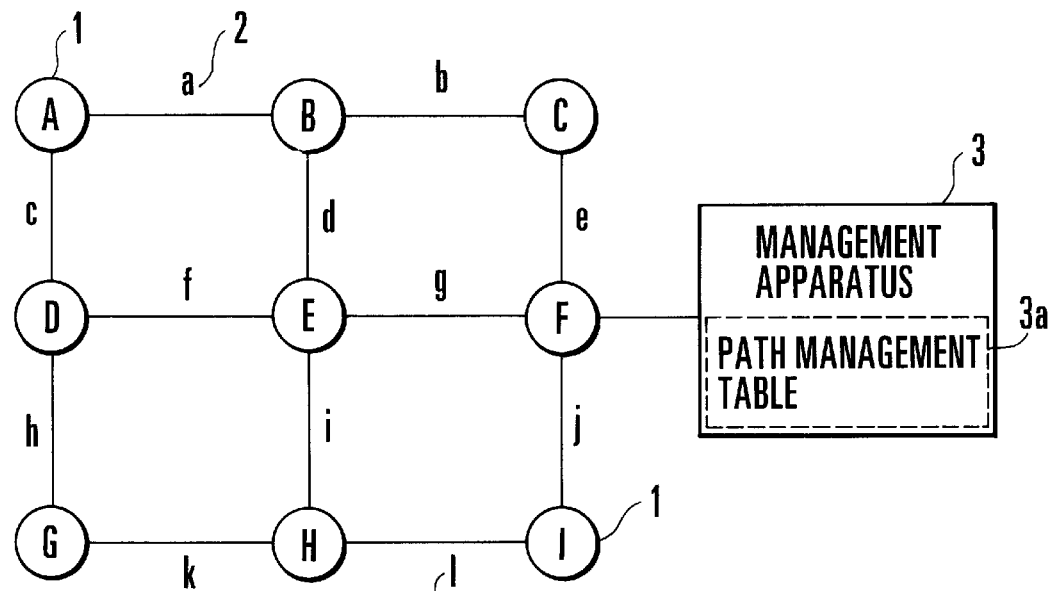
FIG. 1 is a block diagram showing a system configuration having a mesh of paths.

FIG. 1 explains a system configuration according to an embodiment of the present invention. Referring to FIG. 1, reference numeral 1 denotes a plurality of node apparatuses A to I, to each of which a maximum of four paths can be connected; 2, a plurality of transmission paths for connecting two node apparatuses 1 in a one-to-one correspondence; 3, a management apparatus having a path management table 3a for managing the paths for node apparatuses and for monitoring and controlling the overall network, constituted by the node apparatuses 1 and the transmission paths 2, by using the path management table 3a to search for available paths, to set paths, and to register and update the path management table 3a.

Figure 3:
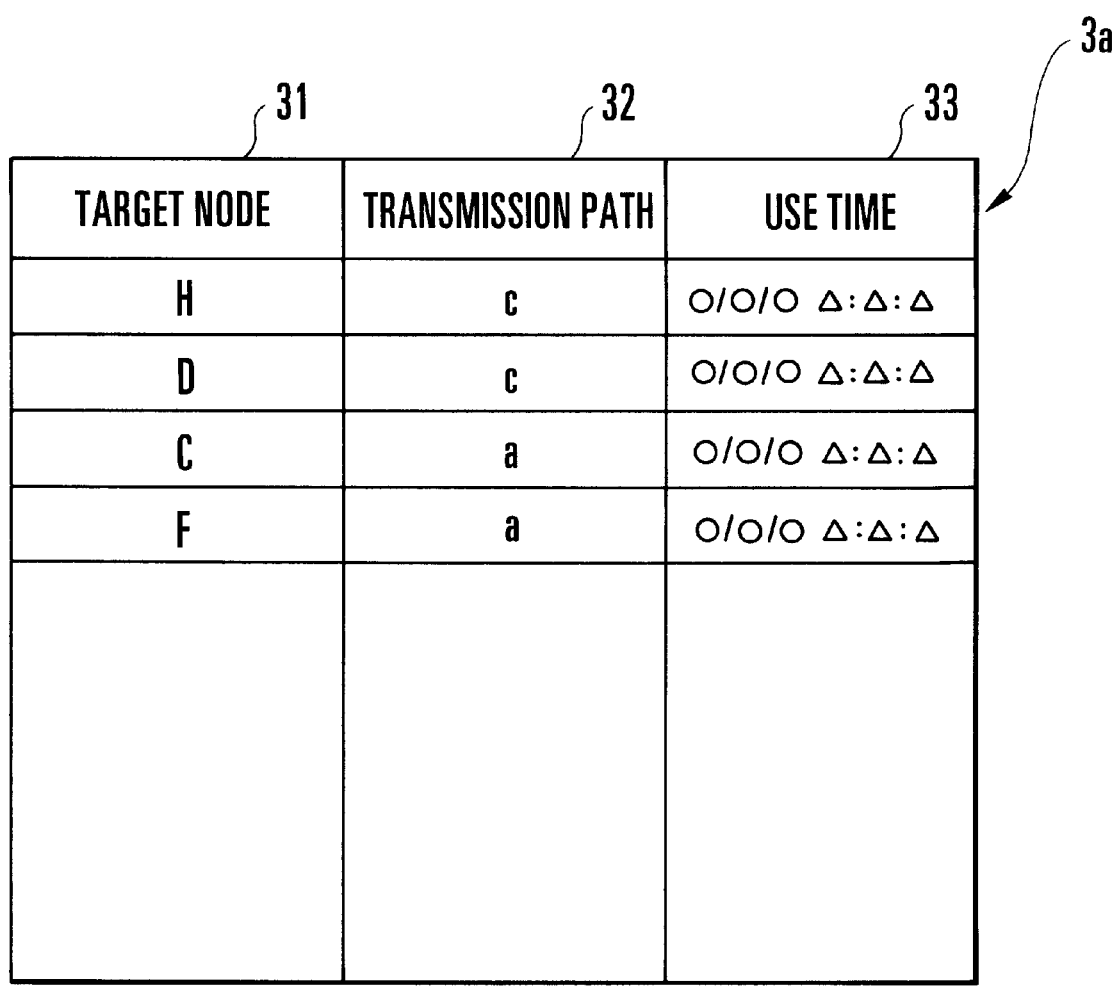
FIG. 3 is a view showing data associated with a node apparatus A and stored in a path management table.

FIG. 3 shows data associated with the node apparatus A and registered in the path management table 3a of the management apparatus 3. Referring to FIG. 3, a target node 31 in the path management table 3a indicates a final target node apparatus to be connected to the node apparatus A; a transmission path 32, a transmission path adjacent to the node apparatus A when the node apparatus A and the target node are connected to each other through the shortest path; and a use time 33, the time when the adjacent transmission path was used to connect to the target node apparatus.

Figure 2:
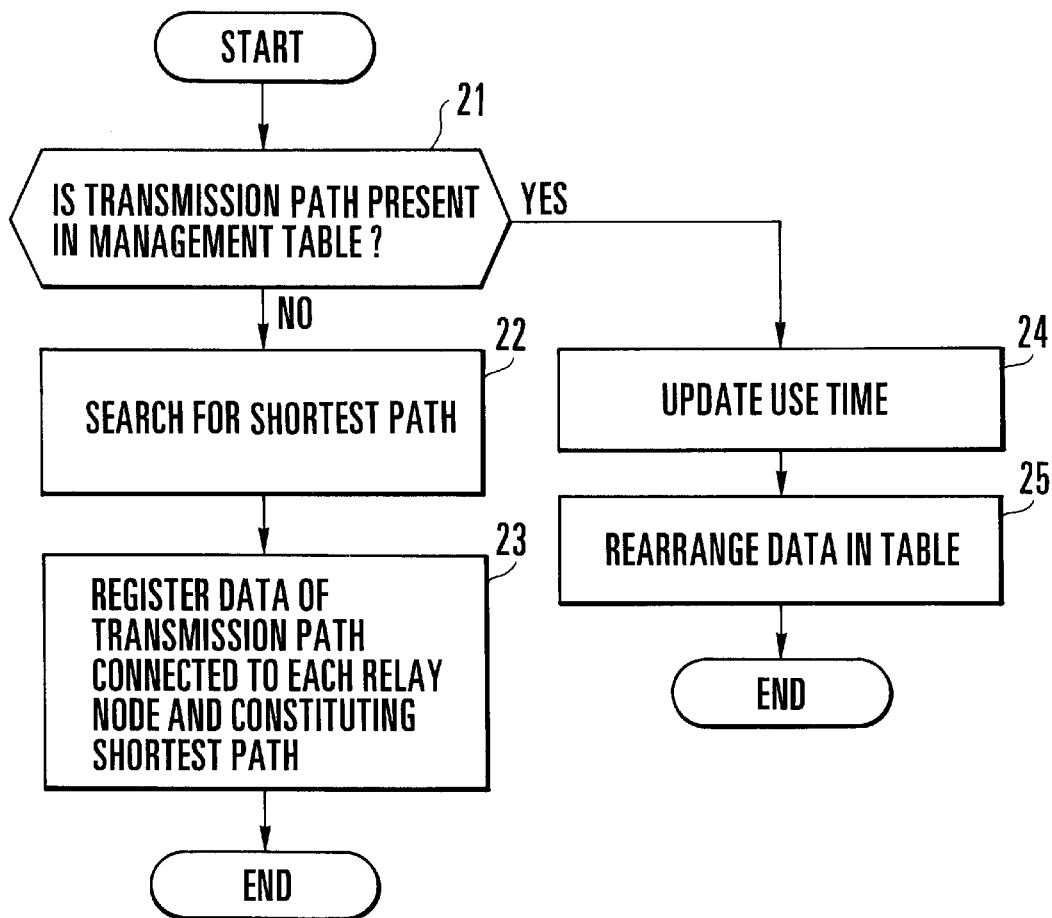
FIG. 2 is a flow chart showing a method of searching for an available path in a mesh architecture according to the present invention.

FIG. 2 shows search processing in the present invention. Referring to FIG. 2, when a path is to be set between two node apparatuses, step S21 checks whether the transmission path between the two node apparatuses has already been registered in the path management table 3a of the management apparatus 3. If the transmission path between the two node apparatuses is present on the path management table 3a, so that the shortest path has been set between the two node apparatuses, the transmission path use time 33 registered in the path management table 3a is updated to the current time in step S24. In step S25, the data on the path management table 3a are rearranged to place the updated data block of the use time 33 at the head of the path management table 3a.

If it is determined in step S21 that the transmission path between the node apparatuses is not registered in the path management table 3a, so that no shortest path has been set between the node apparatuses, searching (setting) for the shortest path between the node apparatuses is performed, and an adjacent transmission path included in the shortest path connecting to the target node apparatus is registered in the path management table 3a in step S22. At the same time, the transmission path use time is registered. In step S23, with regard to each relay node apparatus present on the shortest path between the node apparatuses, data including an adjacent path constituting the shortest path to the target node apparatus is registered.

More specifically, when, for example, a path is to be set from the node apparatus A to the node apparatus H in FIG. 1, the data associated with the node apparatus A and registered in the path management table 3a of the management apparatus 3 is searched first. If the node apparatus H is registered as the target node 31 when viewed from the node apparatus A, the use time 33 corresponding to the target node apparatus H is updated to the current time. At the same time, the data in the path management table 3a are rearranged to place the data associated with the target node apparatus H at the head of the path management table 3a. The node apparatus D, as a destination to which the node apparatus A is to be connected, is then obtained on the basis of the transmission path c adjacent to the node apparatus A and registered in correspondence with the target node apparatus H.

Subsequently, the data associated with the node apparatus D and registered in the path management table 3a is searched to check whether the node apparatus H has been registered as a target node apparatus for the node apparatus D. If it is determined that the node apparatus H has been registered as the target node apparatus, a node apparatus as a destination to which the node apparatus D is to be connected is obtained on the basis of a transmission path adjacent to the node apparatus D and registered in correspondence with the node apparatus H. If, for example, the shortest path from the node apparatus A to the node apparatus H passes through the node apparatuses D and G, the node apparatuses D and G are called relay node apparatuses. Subsequently, the same processing as described above is repeated for each relay node apparatus until a destination to which the transmission path is to be connected coincides with the target node apparatus H. The shortest path from the node apparatus A to the target node apparatus H is then obtained from the previous data in the path management table 3a.

If the target node apparatus H has not been registered in the path management table 3a when viewed from the node apparatus A, searching for the shortest path between the node apparatus A and the target node apparatus H is performed. The transmission path c constituting the shortest path connecting the node apparatus A to the target node apparatus H is registered as a transmission path adjacent to the node apparatus A in the path management table 3a, matched with the target node apparatus H. At the same time, the use time of the transmission path c is registered. Subsequently, data associated with adjacent transmission paths constituting the shortest path are registered for the respective relay node apparatuses, e.g., the node apparatuses D and G, present on the shortest path and corresponding to the target node apparatus H.

The management apparatus 3 periodically checks the use times in the path management table 3a in chronological order, and erases registered data which has not been used for a predetermined period of time. When a use time within the predetermined period of time is detected, subsequent new use time data is not checked.

As has been described above, even if the network architecture increases in size and becomes complicated, since only adjacent transmission paths are registered in the path management table 3a instead of registering all the paths that are searched out, the memory capacity can be reduced. In addition, the time when a certain path was used is registered as data, and the information for the used path is placed at the head of the path management table. The information of a path that has not been used for a predetermined period of time is erased from the path management table 3a, and only necessary path information is registered. For this reason, the time required for a search can be shortened. Furthermore, since the use data of target node apparatuses and adjacent transmission paths are sequentially rearranged in the path management table 3a, the time required for a periodic check on the use state can be shortened.

In the above embodiment, regarding the path management data for the node apparatus A and the relay node apparatuses D and G only, the data of the respective adjacent transmission paths with node apparatus H serving as a target node apparatus are registered and updated. However, the data of adjacent transmission paths with the relay node apparatuses serving as target node apparatuses other than the target node apparatus H, may also be registered and updated as path management data for node apparatus A. In this case, for examples, the path management data for the node apparatus D, data with the relay node apparatus G serving as a target node apparatus, other than the target node apparatus H, are registered and updated.

In the above embodiment, the management data for the respective node apparatuses are registered in different areas in the single path management table 3a. However, path management tables may be arranged for the respective node apparatuses.

What is claimed is:

1. A method of searching for an available path within a mesh architecture of a transmission system including a plurality of nodes having a plurality of paths connected to a mesh network, comprising the steps of:

in setting a shortest path between first and second nodes;

registering first data associated with a transmission path connected to a first relay node adjacent to said first node, and constituting a transmission path included in said shortest path, as path management data for said first node, in a path management table;

registering second data associated with a transmission path connected to a node adjacent to each relay node present on the shortest path as path management data for said each relay node apparatus, in said path management table;

wherein said path management data contains only said single adjacent path, included in said shortest path, for each target node registered for each of the nodes; and searching for an available path between said nodes on the basis of the path management data in said path management table.

2. A method as claimed in claim 1, further comprising the step of erasing path management data from said path management table when a corresponding transmission path registered in said path management table is not used within a predetermined period of time.

3. A method as claimed in claim 2, wherein each data registering step further comprises the step of registering, in said path management table, time data indicating the time a transmission path was used, and wherein the step of erasing the path management data from said path management table comprises the step of erasing path management data in accordance with the time data in said path management table.

4. A method as claimed in claim 3, further comprising the step of, when data associated with a transmission path connected to said second node and constituting the shortest path has already been registered as path management data for said first node and for said each relay node apparatus in said path management table, updating corresponding time data of the path management data in said path management table.

5. A method as claimed in claim 4, further comprising the step of chronologically sorting path management data when time data of the path management data is updated.

6. A method as claimed in claim 1, wherein the path management data further comprises the identity of a target node indicated by said second node, a transmission path connecting an adjacent node to said second node, said transmission path included in said shortest path, and a time when said transmission path was used.

7. A method as claimed in claim 1, wherein each of the steps of registering the data associated with the transmission paths in said path management table further comprises the step of registering at least one transmission path in said path management table corresponding to said second node as a target node.

8. A method as claimed in claim 1, wherein each of the steps of registering the data associated with the transmission paths in said path management table comprises registering transmission paths in said path management table corresponding to said second node and at least one of said each relay node as target nodes.

9. A method of searching for an available path within a mesh architecture of a transmission system including a plurality of nodes having a plurality of paths connected to a mesh network, comprising the steps of:

in setting a shortest path between first and second nodes;

registering first data associated with a transmission path connected to a first relay node adjacent to said first node, and constituting a transmission path included in said shortest path, as path management data for said first node, in a path management table;

registering second data associated with a transmission path connected to a node adjacent to each relay node present on the shortest path as path management data for said each relay node apparatus, in said path management table;

searching for an available path between said nodes on the basis of the path management data in said path management table; and erasing path management data from said path management table when a corresponding transmission path registered in said path management table is not used within a predetermined period of time.

10. A method as claimed in claim 9, wherein each data registering step further comprises the step of registering, in said path management table, time data indicating the time a transmission path was used, and wherein the step of erasing the path management data from said path management table comprises the step of erasing path management data in accordance with the time data in said path management table.

11. A method as claimed in claim 10, further comprising the step of, when data associated with a transmission path connected to said second node and constituting the shortest path has already been registered as path management data for said first node and for said each relay node apparatus in said path management table, updating corresponding time data of the path management data in said path management table.

12. A method as claimed in claim 11, further comprising the step of chronologically sorting path management data when time data of the path management data is updated.

13. A method as claimed in claim 9, wherein the path management data further comprises the identity of a target node indicated by said second node, a transmission path connecting an adjacent node to said second node, said transmission path included in said shortest path, and a time when said transmission path was used.

14. A method as claimed in claim 9, wherein each of the steps of registering the data associated with the transmission paths in said path management table further comprises the step of registering at least one transmission path in said path management table corresponding to said second node as a target node.

15. A method as claimed in claim 9, wherein each of the steps of registering the data associated with the transmission paths in said path management table comprises registering transmission paths in said path management table corresponding to said second node and at least one of said each relay node as target nodes.

* * * * *